US012775954B2

(12) United States Patent
Tessler et al.

(10) Patent No.: US 12,775,954 B2
(45) Date of Patent: Oct. 27, 2026

(54) SYSTEM AND METHODS FOR ECO-CONSCIOUS AUTHENTICATIONS

(71) Applicant: Capital One Services, LLC, McLean, VA (US)

(72) Inventors: Leeyat Bracha Tessler, Arlington, VA (US); Shaun Kieran Webb, Oakland, CA (US); Dan Lin, Arlington, VA (US); Apurv Baichwal, Washington, DC (US); Daniel E. Miller, Brooklyn, NY (US)

(73) Assignee: Capital One Services, LLC, McLean, VA (US)

(*) Notice: Subject to any disclaimer, the term of this patent is extended or adjusted under 35 U.S.C. 154(b) by 59 days.

(21) Appl. No.: 18/194,208

(22) Filed: Mar. 31, 2023

(65) Prior Publication Data

US 2024/0330937 A1 Oct. 3, 2024

(51) Int. Cl.
*G06Q 20/40* (2012.01)

(52) U.S. Cl.
CPC ..... *G06Q 20/4093* (2013.01); *G06Q 20/4014* (2013.01); *G06Q 20/405* (2013.01)

(58) Field of Classification Search
None
See application file for complete search history.

(56) References Cited

U.S. PATENT DOCUMENTS

| | | | | |
|---|---|---|---|---|
| 8,930,236 | B2 | 1/2015 | Gillenson et al. | |
| 2002/0062249 | A1 | 5/2002 | Iannacci | |
| 2003/0233278 | A1* | 12/2003 | Marshall | G06Q 30/0211 705/14.35 |
| 2008/0288405 | A1* | 11/2008 | John | G06Q 20/384 705/44 |
| 2009/0157510 | A1 | 6/2009 | Pridmore et al. | |
| 2019/0333073 | A1* | 10/2019 | Harris | G06Q 30/02 |
| 2020/0051058 | A1* | 2/2020 | Nandakumar | G06Q 20/3226 |
| 2020/0089848 | A1* | 3/2020 | Abdelaziz | G06F 21/316 |
| 2021/0082044 | A1* | 3/2021 | Sliwka | G06Q 10/103 |
| 2021/0256084 | A1* | 8/2021 | Marsh | G06F 16/9537 |

* cited by examiner

*Primary Examiner* — Peter D Nolan
*Assistant Examiner* — Matthew Cobb
(74) *Attorney, Agent, or Firm* — Bookoff McAndrews, PLLC

(57) ABSTRACT

A computer-implemented method for transmitting electronic data. The method may include receiving a user data set for a user, wherein the user data set includes a user identifier and one or more user authentications for one or more entities, each entity of the one or more entities having an entity eco-friendly score, determining a user eco-friendly score for the user based on the one or more user authentications and a respective one or more entity eco-friendly scores, modifying a data store server to store the user identifier and the eco-friendly score for the user, generating a targeted event associated with a user medium, based on the user eco-friendly score, and transmitting, to a user device of the user, the targeted event via the user medium.

20 Claims, 6 Drawing Sheets

SYSTEM AND METHODS FOR ECO-CONSCIOUS AUTHENTICATIONS

TECHNICAL FIELD

Various embodiments of the present disclosure relate generally to techniques for monitoring authentications to promote eco-friendly decisions, and, more particularly, to systems and methods for providing targeted eco-friendly purchase recommendations.

BACKGROUND

Many consumers are interested in making environmentally conscious purchases. In addition, many companies make decisions that favor the environment, such as by using renewable resources, reducing waste, etc.

While certain consumers and companies may be focused on purchasing or producing products that are eco-friendly, the influx of advertisements, influencers, promotions, and information directed at consumers often makes it problematic for consumers to accurately identify eco-friendly products or services. Thus, a consumer seeking to purchase a product that is eco-friendly often needs to spend valuable time researching how each product and its alternatives are made, what type of materials each product includes, and/or other environmental considerations, much of which might be difficult to find or may be unavailable to the consumer. While companies may purchase and rely on advertising campaigns to inform consumers of their eco-friendly products or procedures, advertising campaigns may be ineffective in view of the amount of product promotions that consumers are often exposed to.

Accordingly, there is a need for a system that can effectively monitor authentications (e.g., transactions) and provide targeted eco-friendly purchase recommendations to consumers.

The present disclosure is, at least in part, directed to overcoming one or more of these above-referenced challenges. However, the above-referenced challenges are provided merely as examples and the claims do not necessarily address any or all of the above-referenced challenges. Furthermore, the disclosure may address challenges not explicitly enumerated in the disclosure. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for transmitting electronic data.

A computer-implemented method for transmitting electronic data may include receiving a user data set for a user. The user data set may include a user identifier and one or more user authentications for one or more entities. Each entity of the one or more entities may have an entity eco-friendly score. The method may further include determining a user eco-friendly score for the user based on the one or more user authentications and a respective one or more entity eco-friendly scores. The method may further include modifying a data store server to store the user identifier and the eco-friendly score for the user. The method may further include generating a targeted event associated with a user medium and based on the user eco-friendly score. The method may further include transmitting to a user device of the user the targeted event via the user medium. The targeted event may also comprise determining increased rewards for subsequent authentications (e.g., transactions) for one or more subsequent entities having a subsequent entity eco-friendly score that exceeds a threshold entity eco-friendly score, providing the increased rewards for the subsequent authentications (e.g., transactions) via a graphical user interface (GUI), with the increased rewards ordered based on an ordering scheme. The targeted event may also comprise of identifying a proposed entity based on the user eco-friendly score and a proposed entity eco-friendly score and identifying the proposed entity may be based on a determined subsequent increase to the user eco-friendly score based on subsequent authentications (e.g., transactions) at the proposed entity. The method may further comprise of receiving a subsequent user authentication at the proposed entity, providing an indication of the subsequent user authentication to a machine learning model, receiving an updated user eco-friendly score as an output of the machine learning model, and identifying an updated proposed entity based on the updated user eco-friendly score and an updated proposed entity eco-friendly score. The user medium may include a user account, a browser, or an extension. Determining the user eco-friendly score may comprise of receiving a machine learning output from a trained machine learning model configured to output the user eco-friendly score based on one or more trends identified from the user authentications (e.g., transactions). The one or more trends may be identified by comparing the one or more user authentications with one or more other user data sets for one or more other users. Each of the one or more other user data sets may include one or more other user authentications for one or more other entities having corresponding other entity eco-friendly scores. The user eco-friendly score may be based on a percentage of user authentications at entities having respective entity eco-friendly scores that exceed an entity eco-friendly score threshold in comparison to a total number of user authentications. The user eco-friendly score may be based on a number of user authentications at entities having respective entity eco-friendly scores that exceed an entity eco-friendly score threshold within a threshold period of time.

A computer-implemented method for transmitting electronic data may comprise receiving a user data set for a user including a user identifier and one or more user authentications for one or more entities having an entity eco-friendly score. The method may include determining a user eco-friendly score for the user based on the one or more user authentications and a respective one or more entity eco-friendly scores and receiving, at a user medium, a targeted authentication for one or more entities based on the user having an eco-friendly score above a threshold. In addition, the method may include transmitting the targeted authentication to the user based on the user having an eco-friendly score above the threshold, determining that the user authenticates the targeted authentication, and adjusting the eco-friendly score of the user based on determining that the user authenticates the targeted authentication. The method may further include determining increased rewards for subsequent authentications for one or more subsequent entities having a subsequent entity eco-friendly score that exceeds a threshold eco-friendly score and providing the increased rewards for the subsequent authentications via a GUI and the increased rewards may be ordered, within the GUI, based on an ordering scheme. The targeted authentication may comprise identifying a proposed entity based on the user eco-friendly score and a proposed entity eco-friendly score. The identifying of the proposed entity may be based on a determined subsequent increase to the user eco-friendly score and based on subsequent authentications at the proposed entity. The method may further comprise receiving a subsequent user authentication at the proposed entity, providing an indication of the subsequent user authentication to a machine learning model, receiving an updated user eco-friendly score as an output of the machine learning model, and identifying an updated proposed entity based on the updated user eco-friendly score and an updated proposed entity eco-friendly score. The user medium may include a user account, a browser, or an extension. Determining the user eco-friendly score may comprise receiving a machine learning output from a trained machine learning model configured to output the user eco-friendly score based on one or more trends identified from the user authentications. The one or more trends may be identified by comparing the one or more user authentications with one or more other user data sets for one or more other users where each of the one or more other user data sets may include one or more other user authentications for one or more other entities having corresponding other entity eco-friendly scores. The user eco-friendly score may be based on a percentage of user authentications at entities having respective entity eco-friendly scores that exceed an entity eco-friendly score threshold in comparison to a total number of user authentications.

A system for transmitting electronic data may comprise receiving a user data set for a user that includes a user identifier and one or more user authentications for one or more entities having an entity eco-friendly score, determining a user eco-friendly score for the user based on the one or more user authentications and a respective one or more entity eco-friendly scores, modifying a data store server to store the user identifier and the eco-friendly score for the user, generating a targeted event associated with a user medium and based on the user eco-friendly score, and transmitting, to a user device of the user, the targeted event via the user medium.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. As will be apparent from the embodiments below, an advantage to the disclosed systems and methods is that multiple parties may fully utilize their data without allowing others to have direct access to raw data. The disclosed systems and methods discussed below may allow advertisers to understand users' online behaviors through the indirect use of raw data and may maintain privacy of the users and the data.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to techniques for monitoring authentications (e.g., transactions) to promote eco-friendly decisions, and, more particularly, to systems and methods for providing targeted eco-friendly purchase recommendations.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," and/or "generally," are used to indicate a possible variation of +10% of a stated or understood value.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
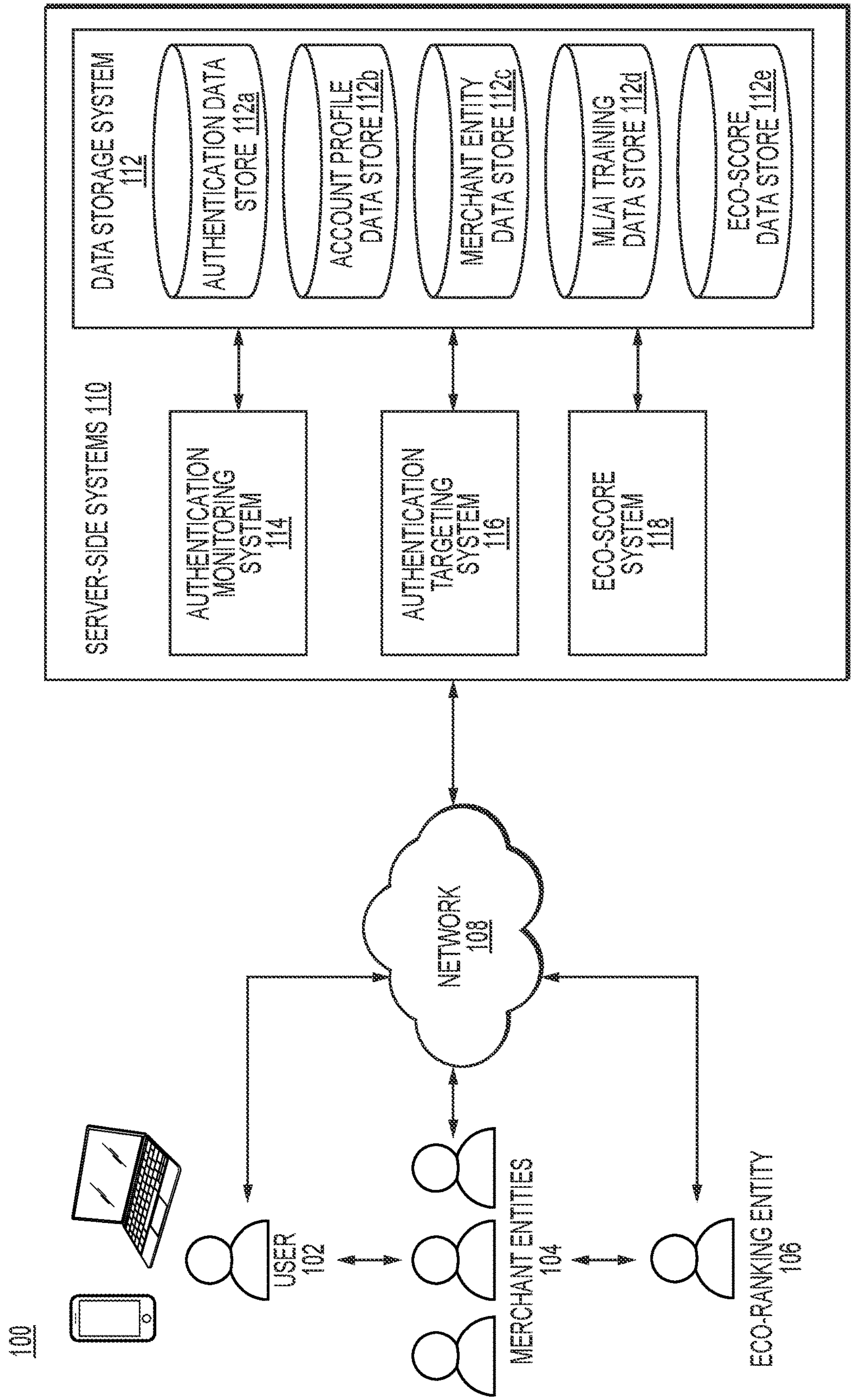
FIG. 1 depicts an exemplary environment for providing targeted eco-friendly purchase recommendations, according to one or more embodiments.

Any suitable system infrastructure may be used to allow a user to receive targeted eco-friendly purchase recommendations. FIG. 1 and the following discussion provide a brief, general description of a suitable computing environment in which the present disclosure may be implemented. In one embodiment, any of the disclosed systems, methods, and/or graphical user interfaces may be executed by or implemented by a generic or special computing system such as, for example, one that is consistent with or similar to the computer system depicted in FIG. 6. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other user mediums, communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other electronic networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As used herein, an authentication may correspond to a transaction or exchange (e.g., deal, trade, agreement, etc.) of goods, services, commodities, financial instruments, etc., between two or more parties and may occur in various settings, such as in-person, online, or through intermediaries like banks or brokers.

As used herein, eco-scoring may correspond to a score (e.g., a value, a ratio, a tier, a percentage, etc.) associated with environmental impact. For users, eco-scoring may be based on the actual, estimated, simulated or other effect goods, services, commodities, financial instruments, etc. associated with the user's authentications have on the environment. For example, environmentally friendly authentications (e.g., authentications associated with environmentally friendly goods, services, commodities, financial instruments, etc.) associated with a user may increase an eco-score for the user. For merchants, eco-scoring may be based on goods, sourcing, manufacturing, business practices, distribution, suppliers, or other factors and how such factors affect the environment. For example, a merchant that purchases from sustainable suppliers and promotes recycled products may have a higher eco-scoring. Conversely, a merchant that is known for ignoring environmental protection laws may have an unfavorable eco-score. In addition, as used herein, eco-ranking may correspond to multiple merchant entities and how the merchant entities rank relative to each other based on their respective entity eco-friendly scores.

As shown in FIG. 1, an exemplary environment 100 for providing targeted eco-friendly purchase recommendations is depicted, according to one or more embodiments. Environment 100 may include a user 102. User 102 may be a consumer, an individual, an entity, or the like. User 102 may, for example, seek to initiate or initiate a purchase from merchant entities 104. Merchant entities 104 may include persons, entities, companies, businesses, organizations, etc., that sell goods, services, and/or products to consumers such as user 102. Merchant entities 104 may also include parties or individuals involved in the production or distribution of consumer goods or services. Eco-ranking entity 106 may include or be otherwise in communication with a third party entity that reviews merchant entities 104 to determine an entity eco-friendly score for respective merchant entities 104. Eco-ranking entity 106 may maintain an overall list of eco-friendly merchants and a corresponding entity eco-friendly score for each merchant. Eco-ranking entity 106 and/or the third party may conduct surveys, perform research, and/or utilize information to determine entity eco-friendly scores for the merchants or may utilize other databases and information to determine entity eco-friendly scores for merchants. Although user 102, merchant entities 104, and eco-ranking entity 106 are shown in FIG. 1, it will be understood that user 102, merchant entities 104, and eco-ranking entity 106 may correspond to associated devices, servers, databases, and/or other components (e.g., such as those described in FIG. 6 herein).

Network 108 connects user 102, merchant entities 104, and an eco-ranking entity 106 with server-side systems 110. Server-side systems 110 may include an authentication monitoring system 114, authentication targeting system 116, and eco-scoring system 118. Authentication monitoring system 114, authentication targeting system 116, and eco-scoring system 118 may utilize data storage systems 112 that store and process data on local and/or remote memory storage devices. Exemplary embodiments of the different types of data stores may include an authentication data store 112*a*, account profile data store 112*b*, merchant entity data store 112*c*, machine learning/artificial intelligence (ML/AI) training data store 112*d*, or an eco-score data store 112*e*.

In exemplary embodiment, an authentication monitoring system 114 may store and process data related to authentications (e.g., transactions) made by one or more users (e.g., user 102) at one or more merchants (e.g., from merchant entities 104). Authentication data (e.g., transaction data) may include one or more purchase characteristics (e.g., data fields) relating to the authentication. The one or more purchase characteristics may include, but are not limited to, a product (e.g., good, service, etc.) name, a merchant name, an authentication date, an authentication time, an authentication identification number, an authentication amount, a merchant identification number, a merchant category code, a product description, an authentication description, an image, and more. Alternatively, merchant entities 104 may be configured to communicate the authentication data to authentication monitoring system 114. The authentication data may be stored in the authentication data store 112*a* and/or in account profile data store 112*b* and may be associated with user 102 and/or a user profile.

As mentioned, authentication monitoring system 114 may receive authentication data that includes authentications (e.g., transactions) made by user 102. In one exemplary embodiment, user 102 may opt in to automatically sharing authentication data by allowing authentication monitoring system 114 to access an application programming interface (API) to automatically download and receive authentication data for storage and future processing. As an example, after user 102 opts into automatically sharing authentication information with authentication monitoring system 114, authentication monitoring system 114 may access a credit card or bank platform (e.g., website, database, server, etc.), via an applicable API, to automatically download authentications (e.g., historical transactions, transactions in real-time, etc.). In another embodiment, user 102 may provide authentication monitoring system 114 authentication information, either by entering authentications and corresponding information via an interface, or by providing the information as a data packet such as by providing a bank or credit card statement. In this scenario, authentication monitoring system 114 may parse the data packet, such as a digital bank statement, to determine information related to authentications. According to an embodiment, a data packet may be provided as an input to a machine learning model, as discussed herein, and the machine learning model may be trained to output authentication data (e.g., purchase characteristics) based on the data packet. The machine learning model may be trained using supervised or unsupervised training and may be trained using historical or simulated data packets, corresponding tags, and/or corresponding authentication data (e.g., purchase characteristics).

Server-side systems 110 may also include authentication targeting system 116. In an exemplary embodiment, authentication targeting system 116 may utilize authentication data, information from eco-ranking entity 106, and/or other information, to determine an eco-friendly product to recommend or target to a specific user. Authentication targeting system 116 may determine eco-friendly product recommendations in a variety of ways, as will be discussed in greater detail below, and may utilize data from the account profile data store 112*b* and the merchant entity data store 112*c* to determine the eco-friendly product recommendations. In another exemplary embodiment, the ML/AI training data store 112*d* may be utilized to determine and further train models and/or algorithms to make eco-friendly product recommendations.

Server-side systems 110 may also include eco-scoring system 118. Eco-scoring system 118 may determine an eco-score for users, products, and/or services and may utilize eco-ranking entity 106 to store these determinations at eco-score data store 112*e*. As an exemplary embodiment, eco-ranking entity 106 may be a third party organization or component that provides a list of entity eco-friendly scores for multiple entities (e.g., businesses, organizations, brands, product providers, service providers, manufacturers, etc.). Eco-scoring system 118 may store and organize such eco-friendly scores and/or related information. The eco-friendly scores and/or related information may be used to determine future authentication targets based on communication with the eco-score data store 112*a*. As updates are made by a third party organization regarding adjusted entity eco-friendly scores for entities, eco-scoring system 118 may maintain current entity eco-friendly scores as well as historical entity eco-friendly scores at the eco-score data store 112*a*. Entity eco-rankings may be determined based on entity eco-friendly scores and may rank two or more entities relative to each other based on their respective entity eco-friendly scores.

Figure 2:
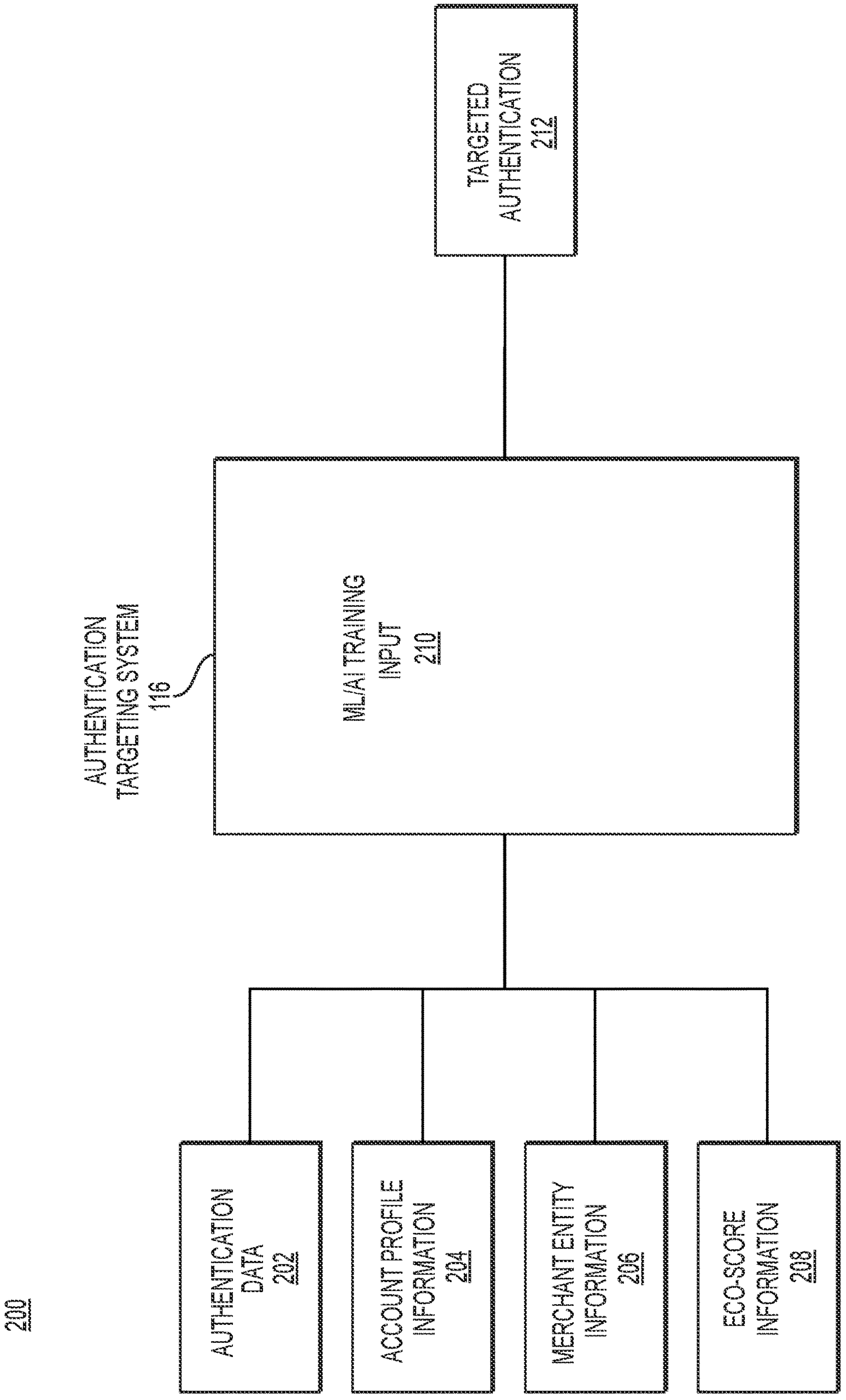
FIG. 2 depicts another exemplary environment for providing targeted eco-friendly purchase recommendations, according to one or more embodiments.

FIG. 2 depicts an exemplary environment 200 for providing targeted eco-friendly purchase recommendations, according to one or more embodiments. Authentication data 202 may include one or more purchase characteristics (e.g., data fields) relating to the authentication. The one or more purchase characteristics may include, but are not limited to, a product (e.g., good, service, etc.) name, a merchant name, an authentication date, an authentication time, an authentication identification number, an authentication amount, a merchant identification number, a merchant category code, a product description, an authentication description, an image, and more.

Account profile information 204 may include information associated with a user and corresponding information such as user eco-friendly scores. Similarly, merchant entity information 206 may include information associated with a merchant and corresponding information such as entity eco-friendly scores. Eco-scoring information 208 may include the combination of current or historical eco-friendly information for merchants including merchant scores in relation to other merchants and/or eco-friendly information organized by source in instances where eco-friendly information is received from multiple eco-ranking entities 106.

Authentication data 202, account profile information 204, merchant entity information 206, and/or eco-scoring information 208 may provide inputs to the authentication targeting system 116, such as to ML/AI training input component 210. ML/AI training input component 210 is discussed below and in reference to FIG. 5. Authentication targeting system 116 may use ML/AI to analyze data provided by authentication data 202, account profile information 204, merchant entity information 206, and/or eco-scoring information 208 to output a targeted authentication 212. Targeted authentication 212 may be an indication, message, offer, or the like to purchase a product, a service, or be related to any other applicable authentication. Targeted authentication 212 may be provided using a graphical user interface (GUI) of a user device (e.g., associated with user 102). A GUI may be any type of user interface that allows a user 102 to interact with electronic devices through visual elements such as icons, buttons, and menus or to navigate through software applications, operating systems, and other digital interfaces. Targeted authentication 212 may also include associated other information (e.g., eco-scores, eco-score changes based on completing an authorization associated with targeted authentication 212, etc.). For example, other information may include how much an eco-friendly score for the user will increase if an eco-friendly product indicated in targeted authentication 212 is purchased. According to an implementation, gamification principals may be included (e.g., based on targeted authentication 212, associated other information, etc.) to engage and/or motivate individuals to purchase eco-friendly products and services. By adding game-like elements, such as points, levels, badges, leaderboards, and challenges, a more interactive, competitive, and/or rewarding experience may be provided to individuals to encourage individuals to participate and complete targeted authentication 212 based authorizations with more enthusiasm and dedication. Gamification may also tap into the human desire for achievement, recognition, and mastery, and provide instant feedback, social recognition, and a sense of progress and accomplishment. It may be a powerful tool for increasing motivation to purchase more eco-friendly products and services.

Figure 3:
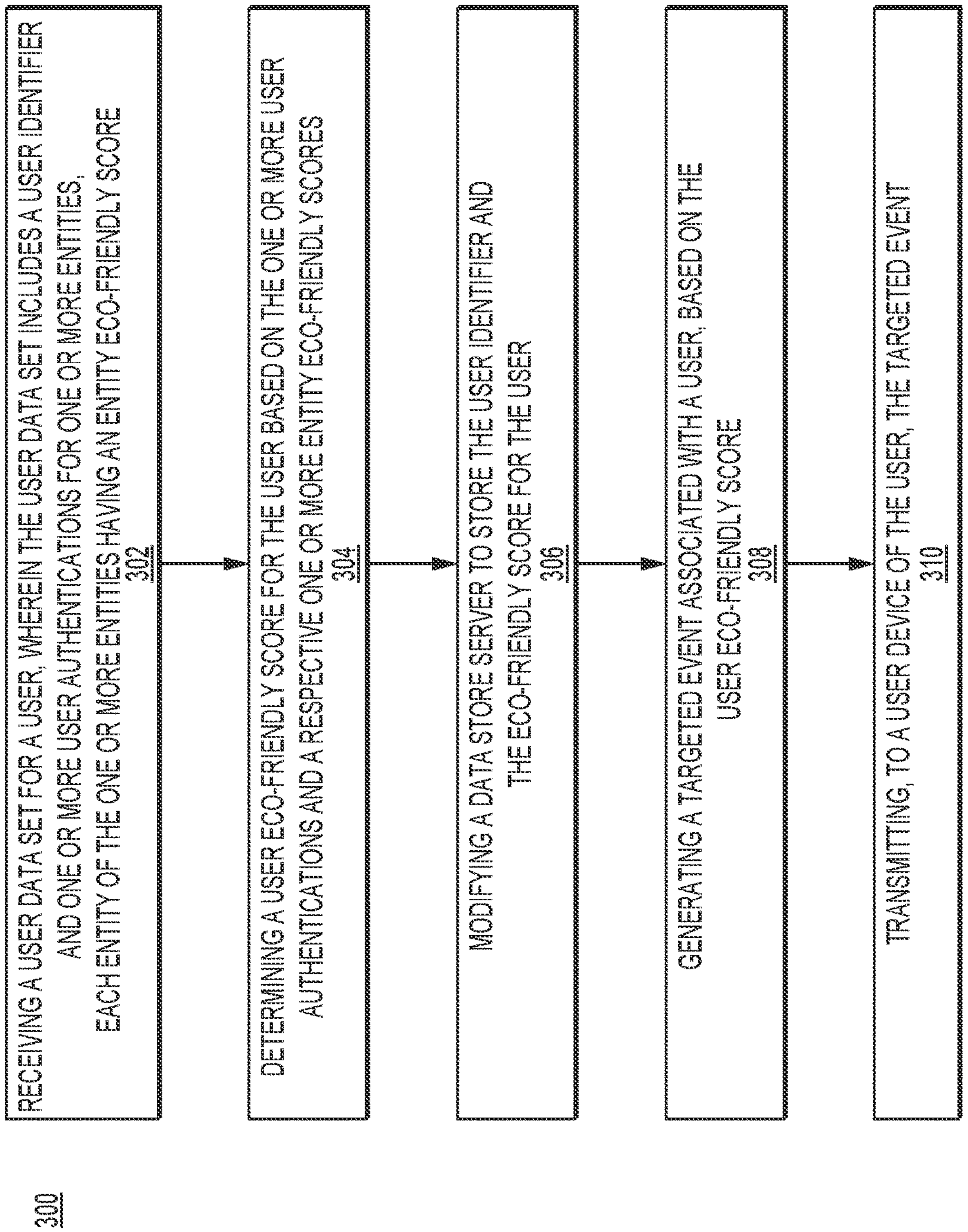
FIG. 3 depicts a flowchart of an exemplary method of providing targeted eco-friendly purchase recommendations, according to one or more embodiments.

FIG. 3 depicts a flowchart of an exemplary method 300 of providing targeted eco-friendly purchase recommendations, according to one or more embodiments. In one exemplary embodiment, step 302 includes receiving a user data set for a user, wherein the user data set includes a user identifier and one or more user authentications (e.g., transactions) for one or more entities, each entity of the one or more entities having an entity eco-friendly score. In one exemplary embodiment, user data set may be received through a web form or an application that the user fills out by providing inputs such as an identifier (e.g., email address, username), and a credential (e.g., password, biometric credential, etc.) to log in or otherwise access a profile. After logging in to the profile, the user may selector opt-in to allowing authentications (e.g., transactions) to be received automatically, such as by accessing an API, as discussed herein. In this embodiment, the user data set is received automatically through API integrations with the user's existing accounts with the one or more entities. The API may pull the user's authentication history along with the entity eco-friendly scores associated with the entities corresponding to the user's authentications (e.g., transactions).

In another embodiment, the user may enter authentication data sets (e.g., using an interface). The user may, for example, be provided a web form where information is filled in by the user. The information may be related to the user's authentications and include details such as date, item/service, merchant, price, location, eco-friendly ranking, etc. In another embodiment, the user data set is received through a combination of manual input and API integrations. The user inputs their identifier and authenticates with some entities manually, while others are authenticated through API integrations.

Step 302 may also include an entity eco-friendly score for each entity and/or authentications associated with the user data set. The entity eco-friendly score may be based on a scale, ranking, and/or point based scoring mechanism. The eco-friendly scores may provide an indication as to the eco-friendliness of respective merchant entities. The eco-friendly scores may be determined by eco-ranking entity 106 and stored/accessed by eco-scoring system 118 from an eco-score data store 112*a*. Eco-ranking entity 106 may determine the eco-friendly scores based on environmental parameters and consideration such as, but not limited to, waste prevention, sustainability, recyclability, toxicity, decomposition rate, reusability, materials, energy use, philanthropic activities, culture, or any other number of factors.

Step 304 may include determining a user eco-friendly score for the user based on the one or more user authentications (e.g., transactions) and a respective one or more entity eco-friendly scores. In one exemplary embodiment, the user eco-friendly score is determined by finding an average score based on previous authorizations and the corresponding eco-friendly score. Another embodiment may include applying a weighted averaging formula to authorizations and corresponding entity eco-friendly scores. Weighting may be based on quantity, cost, date purchased, frequency, or other factors. For example, a product that was purchased for $100 may impact the eco-friendly score of the user more than a purchase for $1. As another example, a product that was purchased within a preceding week may have a heavier weighting than a product that was purchased 5 years ago. Various weightings may be used in a variety of combinations. Eco-friendly scores may also be based on a comparison with a total number of user authentications.

In another exemplary embodiment, the authorization data may be utilized to determine a user eco-friendly score by utilizing a machine learning/artificial intelligence model. While a ML/AI model will be discussed in greater detail below in combination with FIG. 5, a ML/AI model may be trained using historical, simulated, and/or ongoing authorization data from a large number of users, the authorizations associated with the users, and/or entity eco-friendly scores associated with the authorizations. An ML/AI model may determine a user's eco-friendly score based on algorithms trained by a combination of human and machine inputs. For example, a team of human evaluators may review the user's authentications and entity eco-friendly scores, and assign an eco-friendly score to the user. This score is then used to train a machine learning algorithm, which is then used to determine the user's eco-friendly score for future authentications.

As the user's eco-friendly score is based on authentications with entities and the eco-friendliness of those entities, making more purchases that are eco-friendly may increase a user eco-friendly score of the user. Accordingly, step 306 may include modifying a data store server to store the user eco-friendly score (e.g., a determined or updated user eco-friendly score) for the user. In one example embodiment, the user eco-friendly score may increase if authorizations by the user become increasingly more eco-friendly (e.g., based on a trend or acceleration of such authorizations). Conversely, if it is determined that the user is making purchases from entities with lower entity eco-friendly scores, a user's eco-friendly score may decrease.

Step 308 may include generating a targeted event associated with a user, based on the user eco-friendly score and/or corresponding increased rewards. The targeted event may further be based on additional user information, such as authentications at that may be determined based on the user data set received at step 302, or may be otherwise associated with the user. The targeted event may also be determined based on how a subsequent authorization at a proposed entity having a proposed entity eco-friendly score may increase the user's eco-friendly score (or a determined subsequent increase to the user eco-friendly score). If, for example, a user has a user eco-friendly score above a user eco-friendly score threshold indicating a preference for eco-friendly products, the targeted event may include offering an eco-friendly product or service (e.g., subsequent authentications at subsequent entities), or proposing a proposed entity that has a high entity eco-friendly score (e.g., a subsequent entity having a subsequent entity eco-friendly score higher than an entity eco-friendly score threshold). Similarly, if the user has a user eco-friendly score below the user eco-friendly score threshold, the targeted event may include offering products other than an eco-friendly product or a less eco-friendly product (e.g., products from entities having lower entity eco-friendly scores in comparison to products offered to users that meet the an user eco-friendly score threshold), or proposing a proposed entity that has a low entity eco-friendly score. By providing targeted events that are relevant and personalized recommendations, such a system would have the potential to incentivize environmentally conscious behavior and encourage the adoption of eco-friendly practices, while simultaneously respecting other consumers that are not concerned with eco-friendly purchases or practices.

For example, authentication data associated with a user having a user eco-friendly score above the user eco-friendly score threshold may include authentication data that indicates purchases from a recyclable paper product company (e.g., an entity having a relatively high entity eco-friendly score). Further, according to this example, additional user information may include an indication that the user is about to travel (e.g., based on a flight authorization). Accordingly, step 308 may include generating a targeted event for offering rental of an electric car (e.g., from an entity or product having a relative high entity eco-friendly score). In another exemplary embodiment, generating a targeted event may be based on additional user information indicating that a regular purchase of toilet paper is made every 2-3 months, and that the user has a user eco-friendly score above the user eco-friendly score threshold. In this example, the targeted event may be an offer to purchase eco-friendly toilet paper in 2 months from the last toilet paper purchase. In another exemplary embodiment, generating a targeted event may include determining that a regular purchase of toilet paper is made every 2-3 months, but that the user has a user eco-friendly score below the user eco-friendly score threshold. In this example, the targeted event may be an offer to purchase the cheapest toilet paper in 2 months from the last toilet paper purchase.

Although a user eco-friendly score threshold is described herein, it will be understood that a gradient or ranges of user eco-friendly score thresholds may be applied. A user may be associated with a user eco-friendly score tier from a plurality of eco-friendly score tiers. For example, the user may be associated with a user eco-friendly score tier from five different user eco-friendly score tiers, each of the five eco-friendly score tiers being associated with respective ranges of user eco-friendly scores. At step 308, a targeted event may be generated based on the given user eco-friendly score tier for the user.

Step 310 may include transmitting electronic data, to a user device of the user, the targeted event. The transmitted targeted event may be provided via a display (e.g., via a GUI) of the user device and may include authorization information such as the targeted event, merchant entity, price, availability, contact information, etc. The transmitted targeted event may also include one-click/tap actionable buttons that perform actions such as buy now, add to wish-list, share, compare prices, etc. The transmitted targeted event may also include displaying the amount of rewards (e.g., increased rewards for subsequent authentications) that would be received for the transmitted targeted event or other subsequent targeted events. In this embodiment, the user may be provided with a list of ordered targeted authorizations, or an ordering scheme, based on which authorizations will cause the most increase in rewards.

Figure 4:
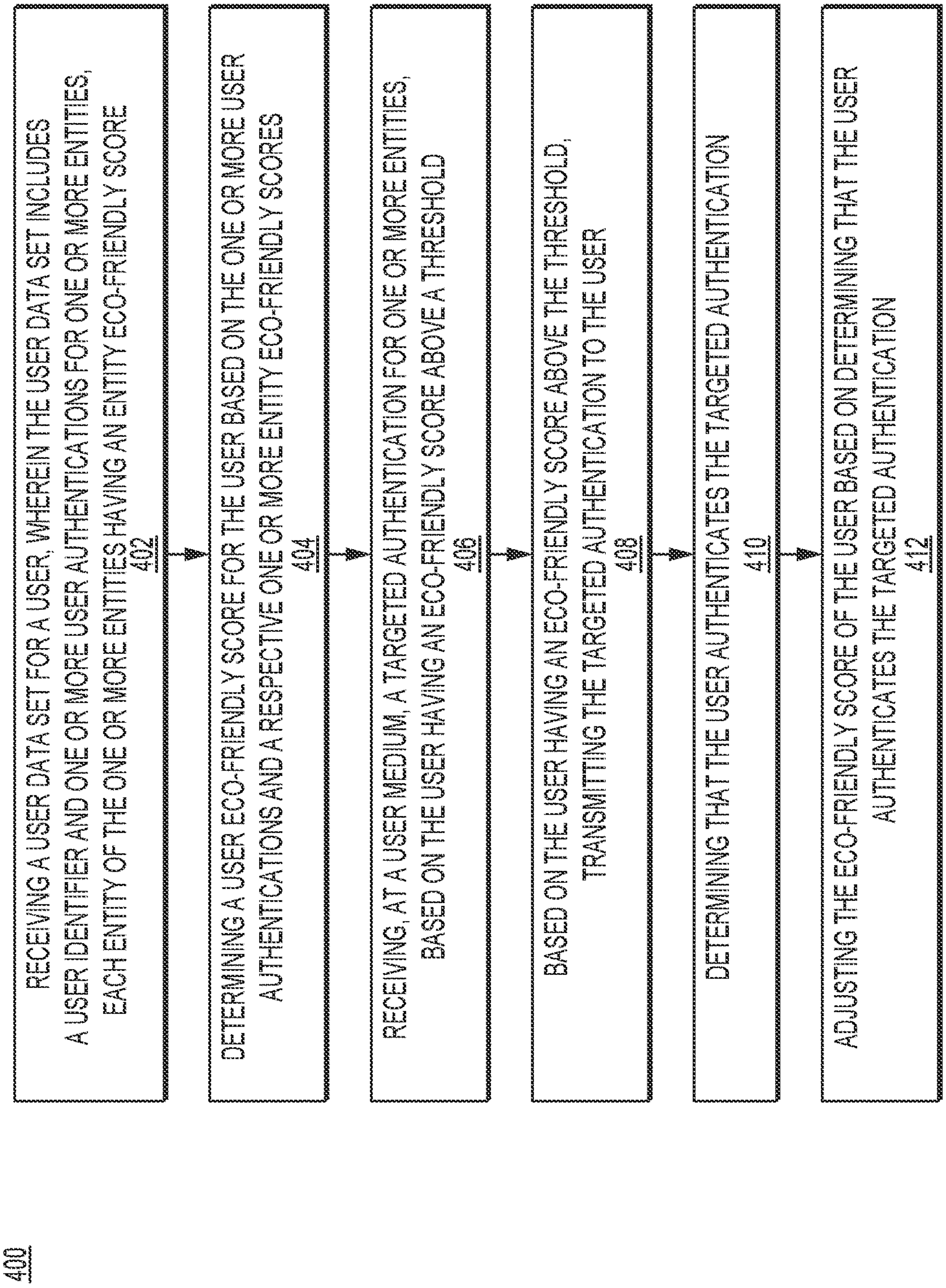
FIG. 4 depicts a flowchart of another exemplary method of providing targeted eco-friendly purchase recommendations, according to one or more embodiments.

FIG. 4 depicts a flowchart 400 of another exemplary method of providing targeted eco-friendly purchase recommendations, according to one or more embodiments. In one exemplary embodiment, step 402 includes receiving a user data set for a user, wherein the user data set includes a user identifier and one or more user authentications (e.g., transactions) for one or more entities, each entity of the one or more entities having an entity eco-friendly score. In one exemplary embodiment, a user data set may be received through a web form or an application that the user fills out by providing inputs such as an identifier (e.g., email address, username), and a credential (e.g., password, biometric credential, etc.) to log in or otherwise access a profile. After logging in to the profile, the user may select or opt in to allowing authentications (e.g., transactions) to be received automatically, such as by accessing an API, as discussed herein. In this embodiment, the user data set is received automatically through API integrations with the user's existing accounts with the one or more entities. The API may pull the user's authentication history along with the entity eco-friendly scores associated with the entities corresponding to the user's authentications.

In another embodiment, the user may enter authentication data sets (e.g., using an interface). The user may, for example, be provided a web form where information is filled in by the user. The information may be related to the user's authentications and include details such as date, item/service, merchant, price, location, eco-friendly ranking, etc. In another embodiment, the user data set is received through a combination of manual input and API integrations. The user inputs their identifier and authenticates with some entities manually, while others are authenticated through API integrations.

Step 402 may also include an entity eco-friendly score for each entity and/or authentication associated with the user data set. The entity eco-friendly score may be based on a scale, ranking, and/or point based scoring mechanism. The eco-friendly scores may provide an indication as to the eco-friendliness of respective merchant entities. The eco-friendly scores may be determined by eco-ranking entity 106 and stored/accessed by eco-scoring system 118 from an eco-score data store 112*a*. Eco-ranking entity 106 may determine the eco-friendly score based on environmental parameters and consideration such as, but not limited to, waste prevention, sustainability, recyclability, toxicity, decomposition rate, reusability, materials, energy use, philanthropic activities, culture, or any other number of factors.

Step 404 may include determining a user eco-friendly score for the user based on the one or more user authentications (e.g., transactions) and a respective one or more entity eco-friendly scores. In one exemplary embodiment, a user eco-friendly score is based on a number of user authentications at entities having respective entity eco-friendly scores that exceed an entity eco-friendly score threshold within a threshold period of time. Another embodiment may include determining how many "sustainable merchants" the user has transacted, and using an external source, such as Morgan Stanly Capital International, to classify "sustainable merchants". Another embodiment for determining a user eco-friendly score may be to determine the percentage of total authentications that were made at sustainable companies. Alternatively, special values may be assigned to a merchants whose brands are typically associated with environmentalism (e.g., Patagonia, Tesla, REI, etc) to assist with determining a user eco-friendly score. In another exemplary embodiment, the user eco-friendly score is determined by finding an average score based on previous authorizations and the corresponding eco-friendly score. Another embodiment may include applying a weighted averaging formula to authorizations and corresponding entity eco-friendly scores. Weighting may be based on quantity, cost, date purchased, frequency, or other factors. For example, a product that was purchased for $100 may impact the eco-friendly score of the user more than a purchase for $1. As another example, a product that was purchased within a preceding week may have a heavier weighting than a product that was purchased 5 years ago. Various weightings may be used in a variety of combinations.

In another exemplary embodiment, the authorization data may be utilized to determine a user eco-friendly score by utilizing a machine learning/artificial intelligence model. While a machine learning/artificial intelligence (ML/AI) model will be discussed in greater detail below in combination with FIG. 5, ML/AI model may be trained using historical, simulated, and/or ongoing authorization data from a large number of users, the authentications associated with the users, and/or entity eco-friendly scores associated with the authorizations. An ML/AI model may determine a user's eco-friendly score based on algorithms trained by a combination of human and machine inputs. For example, a team of human evaluators may review the user's authentications and entity eco-friendly scores, and assign an eco-friendly score to the user. This score is then used to train a machine learning algorithm, which is then used to determine the user's eco-friendly score for future authentications.

Step 406 may include receiving, at a user medium, a targeted authentication for one or more entities, based on the user having a user eco-friendly score that exceeds a user eco-friendly score threshold. As used herein, a user medium may include user devices such as those disclosed above (e.g., computers, wearable computers, all manner of cellular or mobile phones) or a user medium may include applications, programs, or user storage (e.g., user accounts, browsers, extensions, widgets). In one exemplary embodiment, a merchant entity may elect to promote a sale item that would be highly valuable for eco-friendly consumers (e.g., users having a user eco-friendly score above the user eco-friendly score threshold), but may not elect to promote the sale item to non-eco-friendly consumers (e.g., users having a user eco-friendly score below the user eco-friendly score threshold). For example, the merchant entity may determine that only those consumers who have a user eco-friendly score of at least 70 (e.g., from a scale of 0 to 100), may receive the targeted authentication offering the sale item.

Step 408 may include, based on the user having an eco-friendly score above the threshold, transmitting the targeted authentication to the user. Continuing with the previous example, a user with a user eco-friendly score of 75 may receive the targeted authentication offering the sale item, because the user eco-score of 75 met/exceeded the threshold of 70. However, a user with a user eco-friendly of 45 would not meet the threshold and would not receive a transmission of the targeted authentication. Alternatively, the user may be provided with proposed entities (e.g., a subsequent entities) for making authorizations based on the proposed entity similarly having a high entity eco-friendly score or on a determined subsequent increase to the user eco-friendly score.

Step 410 may include determining that the user authenticates the targeted authentication, such as by completing an authorization for an offer provided via the targeted authentication. Step 412 may include adjusting the user eco-friendly score of the user based on determining that the user completed the authorization for the offer provided via the targeted authentication. For example, if a user receives a targeted authentication to purchase an eco-favorable product, the purchase of the product may increase the user's user eco-friendly score (or a determined subsequent increase to the user eco-friendly score).

According to an embodiment of the disclosed subject matter, a user acceptance or authorization of a provided targeted authorization may cause an increase in eco-based rewards associated with the user's account. The eco-based rewards may be determined as a function of a user's user eco-friendly scored. A number of awards allocated to a user may increase in proportion to the first user's user eco-friendly score. As a simplified example, a first user having a user eco-friendly score of 10 may purchase a product from an entity having an entity eco-friendly score of 40. The user's user eco-friendly score of 10 and the entity's entity eco-friendly score of 40 may be used to determine a reward amount (e.g., by multiplying 10 times 40 to obtain 400 reward points). Similarly, a second user having a user eco-friendly score of 20 may purchase a product from the same entity having an entity eco-friendly score of 40. The second user's user eco-friendly score of 20 and the entity's entity eco-friendly score of 40 may be used to determine a reward amount (e.g., by multiplying 20 times 40 to obtain 800 reward points). Accordingly, a user's reward allocation may be adjusted based on the user's user eco-friendly score and the user may be rewarded more heavily based on a higher user eco-friendly score.

According to an embodiment of the disclosed subject matter, a user may receive and apply rewards associated with one or more entities. The value of the applied rewards may be determined based on the entity eco-friendly score of the entity. For example, a user may receive one reward point for an authorization that is made at an entity with an entity eco-friendly score below 50, two reward points for an authorization that is made at an entity with an entity eco-friendly score above 50, and three reward points for an authorization that is made at an entity with an entity eco-friendly score above 80. After accumulating enough points, a user may redeem the points for rewards (e.g., cash or percentage discounts). For example, a user may redeem 2 points to get an additional 10% off a selected authorization, or use 3 points to get 15% off any authorization at participating merchants.

According to an embodiment of the disclosed subject matter, a first machine learning model may receive a user data set including user authentications (e.g., transactions) and additional user information. The first machine learning model may output a user eco-friendly score based at least on the user authentications (e.g., transactions), in accordance with the techniques disclosed herein. The first machine learning output including the user eco-friendly score may be output to a second machine learning model trained to generate targeted authentication in accordance with the techniques disclosed herein. This process may be iterated such that the first machine learning model may output updated user eco-friendly scores based on, for example, updated user authorizations. The second machine learning model may generate updated targeted authorizations, or updated proposed entities, based on the updated user eco-friendly scores.

Figure 5:
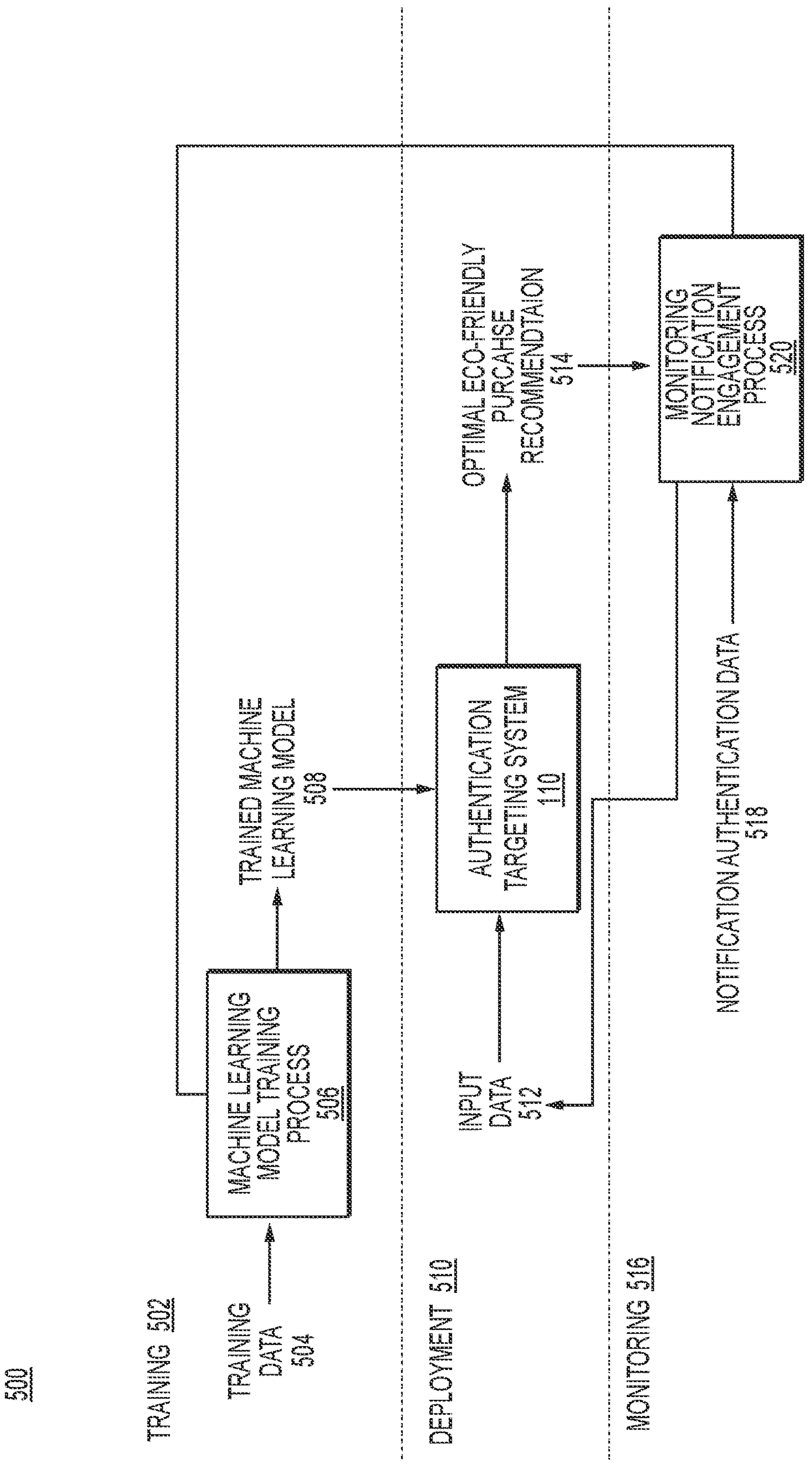
FIG. 5 depicts a flowchart of an exemplary method of providing targeted eco-friendly purchase recommendations using a machine learning model, according to one or more embodiments.

FIG. 5 depicts a process 500 of an exemplary method of providing targeted eco-friendly purchase recommendations using a machine learning model, according to one or more embodiments. In one exemplary embodiment, authentication targeting system 116 may generate, store, train, or use a machine learning model or algorithm to determine an eco-friendly product recommendation (e.g., a targeted authentication) to be transmitted or displayed to a user. The authentication targeting system 116 may include a machine learning model and/or instructions associated with the machine learning model, e.g., instructions for generating a machine learning model, training the machine learning model, using the machine learning model, etc. In other embodiments, a system or device other than the authentication targeting system 116 may be used to generate and/or train the machine learning model. For example, such a system may include instructions for generating the machine learning model and the training data, and/or instructions for training the machine learning model. A resulting trained-machine learning model may then be provided to the authentication targeting system 116 for use.

As depicted in FIG. 5, in some examples, the process 500 may include a training phase 502, a deployment phase 510, and a monitoring phase 516. In the training phase 502, at step 506, the process 500 may include receiving and processing training data 504 to generate (e.g., build) a trained machine learning model 508 for determining an eco-friendly product recommendation.

The training data 504 may include historical or simulated eco-friendly product recommendations associated with a plurality of accounts. The accounts may include accounts of other users (e.g., other user data sets including other user authentications at other entities having corresponding other entity eco-friendly scores) and/or the account of the user. The training data 504 may be generated, received, or otherwise obtained from internal and/or external resources. For example, the training data 504 may include historical or simulated eco-friendly product recommendations data associated with one or more accounts provided by the user 102, the data being collected and stored by the server-side systems 110 at data storage system 112 in the authentication data store 112*a*. Additionally, or alternatively, the training data 504 may include historical or simulated eco-friendly product recommendations associated with one or more accounts provided by merchant entities 104 that grants access to their data. In such examples, the accounts provided by the merchant entities 104 may be of a similar type to the accounts provided by the user. In some examples, eco-friendly purchase recommendations may include, for a given authentication, one or more purchase characteristics (e.g., data fields) relating to the authentication. The one or more purchase characteristics may include, but are not limited to, a product (e.g., good, service, etc.) name, a merchant name, an authentication date, an authentication time, an authentication identification number, an authentication amount, a merchant identification number, a merchant category code, a product description, an authentication description, an image, and/or the like.

Generally, a model includes a set of layers or variables, e.g., nodes, neurons, filters, etc., that are tuned, e.g., weighted or biased, to different values via the application of the training data 504. In some examples, the training process at step 506 may employ supervised, unsupervised, semi-supervised, and/or reinforcement learning processes to train the model (e.g., to result in trained machine learning model 508). In some embodiments, a portion of the training data 504 may be withheld during training and/or used to validate the trained machine learning model 508.

When supervised learning processes are employed, labels or scores corresponding to eco-friendly purchase recommendations (e.g., labels, rankings, or scores corresponding to the training data) may facilitate the learning process by providing a ground truth. For example, the labels or scores may indicate the optimal eco-friendly purchase recommendation. Training may proceed by feeding historical eco-friendly purchase recommendation data for a given authentication (e.g., a purchase) from the training data into the model, the model having variables set at initialized values, e.g., at random, based on Gaussian noise, a pre-trained model, or the like. The model may output a predicted optimal eco-friendly purchase recommendation for the sample. The output may be compared with the corresponding label or score (e.g., the ground truth) to determine an error, which may then be back-propagated through the model to adjust the values of the variables. This process may be repeated for a plurality of samples at least until a determined loss or error is below a predefined threshold. In some examples, some of the training data 504 may be withheld and used to further validate or test the trained machine learning model 508.

For unsupervised learning processes, the training data 504 may not include pre-assigned labels, rankings, or scores to aid the learning process. Rather, unsupervised learning processes may include clustering, classification, or the like to identify naturally occurring patterns in the training data 504. K-means clustering or K-Nearest Neighbors may also be used, which may be supervised or unsupervised. Combinations of K-Nearest Neighbors and an unsupervised cluster technique may also be used. For semi-supervised learning, a combination of training data 504 with pre-assigned labels or scores and training data 504 without pre-assigned labels or scores may be used to train the model.

When reinforcement learning is employed, an agent (e.g., an algorithm) may be trained to make a decision regarding the optimal eco-friendly purchase recommendation for the sample from the training data 504 through trial and error. For example, upon making a decision, the agent may then receive feedback (e.g., a positive reward if the predicted optimal eco-friendly purchase recommendation was the actual eco-friendly purchase recommendation that determined), adjust its next decision to maximize the reward, and repeat until a loss function is optimized.

Once trained, the trained machine learning model 508 may be stored and subsequently applied by the authentication targeting system 116 during the deployment phase 510. For example, during the deployment phase 510, the trained machine learning model 508 executed by the authentication targeting system 116 may receive input data 512 related to an authentication. The input data 512 may include one or more purchase characteristics (e.g., data fields) relating to the authentication, such as a product (e.g., good, service, etc.) name, a merchant name, an authentication date, an authentication time, an authentication identification number, an authentication amount, an merchant identification number, a merchant category code, a product description, an authentication description, an image, and more. The machine learning model 508 may output a predicted optimal eco-friendly purchase recommendation 514 which may then be transmitted to a device of the user (not shown in FIG. 5).

Subsequent to transmitting the notification via the predicted optimal eco-friendly purchase recommendation 514, notification engagement data 518 may be collected by the authentication targeting system 116 during the monitoring phase 516. The notification engagement data 518 may include a duration from the notification transmission to an interaction with the notification. Interactions may include performing an internet search of the eco-friendly purchase recommendation, add the eco-friendly purchase recommendation to a shopping cart, or purchasing the eco-friendly purchase recommendation, and/or the like. During process 520, the notification engagement data 518 may be analyzed along with the predicted optimal eco-friendly purchase recommendation 514 and input data 512 to determine an efficacy of the predicted optimal eco-friendly purchase recommendation 514. In some examples, based on the analysis, the process 500 may return to the training phase 502, where at step 506 values of one or more variables of the model may be adjusted, such as when receiving a subsequent user authentication and identifying an updated proposed entity and an updated proposed entity eco-friendly score.

The example process 500 described above is provided merely as an example, and may include additional, fewer, different, or differently arranged aspects than depicted in FIG. 5.

Figure 6:
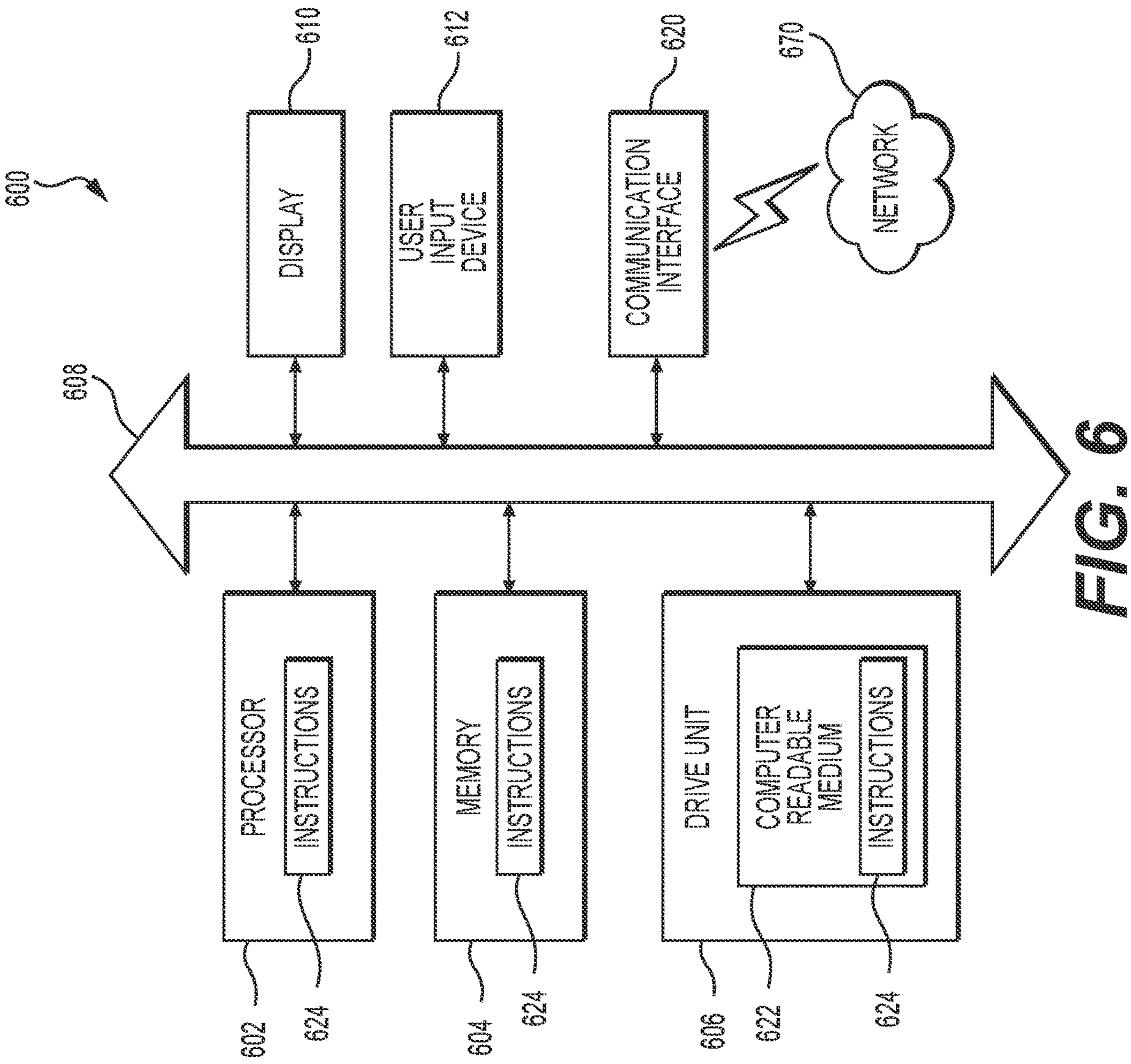
FIG. 6 depicts an example of a computing device, according to one or more embodiments.

FIG. 6 depicts an example of a computer 600, according to certain embodiments. FIG. 6 is a simplified functional block diagram of a computer 600 that may be configured as a device for executing processes or operations depicted in, or described with respect to, FIGS. 1-5, according to exemplary embodiments of the present disclosure. For example, the computer 600 may be configured as devices of user 102, data storage system 112, and/or another device according to exemplary embodiments of this disclosure. In various embodiments, any of the systems herein may be a computer 600 (or include multiple computers 600) including, e.g., a data communication interface 620 for packet data communication. The computer 600 may communicate with one or more other computers 600 using the electronic network 670. The network interfaces may include one or more communication interfaces 620. The electronic network 670 may include a wired or wireless network that is the same as or similar to the network 108 depicted in FIG. 1.

The computer 600 also may include a central processing unit ("CPU"), in the form of one or more processors 602, for executing program instructions 624. The devices of user 102, data storage system 112, and/or another device according to exemplary embodiments of this disclosure may include one or more processors 602. The computer 600 may include an internal communication bus 608, and a drive unit 606 (such as read-only memory (ROM), hard disk drive (HDD), solid-state disk drive (SDD), etc.) that may store data on a computer readable medium 622, although the computer 600 may receive programming and data via network communications. The computer 600 may also have a memory 604 (such as random access memory (RAM)) storing instructions 624 for executing techniques presented herein, although the instructions 624 may be stored temporarily or permanently within other modules of the computer 600 (e.g., processor 602 and/or computer readable medium 622). The devices of user 102, data storage system 112, and/or another device according to exemplary embodiments of this disclosure may include one or more memories 604. The computer 600 also may include user input and output ports 612 and/or a display 610 to connect with input and output devices such as keyboards, mice, touchscreens, monitors, displays, etc. The displays of devices of user 102, data storage system 112, and/or another device according to exemplary embodiments of this disclosure may include one or more displays 610. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, e.g., may enable loading of the software from one computer or processor into another, e.g., from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the disclosed methods, devices, and systems are described with exemplary reference to processing data related to a trip, it should be appreciated that the disclosed embodiments may be applicable to any environment, such as a desktop or laptop computer, an automobile entertainment system, a home entertainment system, etc. Also, the disclosed embodiments may be applicable to any type of Internet protocol.

It should be understood that embodiments in this disclosure are exemplary only, and that other embodiments may include various combinations of features from other embodiments, as well as additional or fewer features. For example, while some of the embodiments above pertain to processing data related to a trip using a machine learning model, any suitable activity may be used. In an exemplary embodiment, instead of or in addition to processing data related to a trip, certain embodiments may include processing data related to planning any event and/or related to services.

It should be appreciated that in the above description of exemplary embodiments of the invention, various features of the invention may sometimes be grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects may lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations are possible within the scope of the disclosure. Accordingly, the disclosure is not to be restricted except in light of the attached claims and their equivalents.

What is claimed is:

1. A computer-implemented method for transmitting electronic data, the method comprising:

receiving a user data set for a user, wherein the user data set includes a user identifier and one or more user authentications for one or more entities;

receiving, from a ranking entity, an entity score for each entity of the one or more entities, the entity score determined by the ranking entity and based on energy use;

determining a user score for the user based on the one or more user authentications and the entity score for each of the one or more entities included in the one or more user authentications;

modifying a data store server to store the user identifier and the user score;

generating, by a trained machine learning model, a targeted event associated with a user medium, based on the user score, the trained machine learning model trained using entity scores as inputs; and transmitting, to a graphical user interface of a user device of the user, the targeted event via an actionable button, wherein the targeted event is automatically initiated upon receiving input from the user.

2. The computer-implemented method of claim 1, wherein the targeted event comprises:

determining increased rewards for subsequent authentications from a subsequent entity having an entity score that exceeds an entity score threshold; and providing the increased rewards for the subsequent authentications via a graphical user interface (GUI), wherein the increased rewards are ordered, within the GUI, based on an ordering scheme.

3. The computer-implemented method of claim 1, wherein the targeted event comprises:

identifying a proposed entity based on the user score and a proposed entity score.

4. The computer-implemented method of claim 3, wherein identifying the proposed entity is based on a determined subsequent increase to the user score based on subsequent authentications at the proposed entity.

5. The computer-implemented method of claim 3, further comprising:

receiving a subsequent user authentication at the proposed entity;

providing an indication of the subsequent user authentication to a machine learning model;

receiving an updated user score as an output of the machine learning model; and identifying an updated proposed entity based on the updated user score.

6. The computer-implemented method of claim 1, wherein the user medium includes a user account, a browser, or an extension.

7. The computer-implemented method of claim 1, wherein determining the user score comprises receiving a machine learning output from a trained machine learning model configured to output the user score based on one or more trends identified from the user authentications.

8. The computer-implemented method of claim 7, wherein the one or more trends are identified by comparing the one or more user authentications with one or more other user data sets for one or more other users, each of the one or more other user data sets including one or more other user authentications for one or more other entities having corresponding other entity scores.

9. The computer-implemented method of claim 1, wherein the user score is based on a percentage of user authentications at entities having respective entity scores that exceed an entity score threshold in comparison to a total number of user authentications.

10. The computer-implemented method of claim 1, wherein the user score is based on a number of user authentications at entities having respective entity scores that exceed an entity score threshold within a threshold period of time.

11. A computer-implemented method for transmitting electronic data, the method comprising:

receiving a user data set for a user, wherein the user data set includes a user identifier and one or more user transactions at one or more entities;

receiving, from a ranking entity, an entity score for each entity of the one or more entities, the entity score determined by the ranking entity and based on energy use;

determining a user score for the user based on the one or more user transactions and the entity score for each of the one or more entities included in the one or more user transactions;

receiving, at a user medium, from a machine learning model, a targeted entity for performing a future transaction based on the user having a score above a threshold;

based on the user having a score above the threshold, transmitting to a graphical user interface of a user device of the user, the targeted entity for performing the future transaction, the graphical user interface including an actionable button;

determining that the user authenticates the future transaction at the targeted entity via input received from the user via the actionable button; and upon determining the user performed the future transaction, automatically initiating the future transaction and adjusting the score of the user.

12. The method of claim 11, further comprising:

determining increased rewards for subsequent transactions from a subsequent entity having an entity score that exceeds an entity score threshold; and providing the increased rewards for the subsequent transactions via a graphical user interface (GUI), wherein the increased rewards are ordered, within the GUI, based on an ordering scheme.

13. The method of claim 11, wherein the targeted future transaction comprises:

identifying a proposed entity based on the user score and a proposed entity score.

14. The method of claim 13, wherein identifying the proposed entity is based on a determined subsequent increase to the user score based on subsequent transactions at the proposed entity.

15. The method of claim 13, further comprising:

receiving a subsequent user transaction at the proposed entity;

providing an indication of the subsequent user transaction to a machine learning model;

receiving an updated user score as an output of the machine learning model; and identifying an updated proposed entity based on the updated user score.

16. The method of claim 11, wherein the user medium includes a user account, a browser, or an extension.

17. The method of claim 11, wherein determining the user score comprises receiving a machine learning output from a trained machine learning model configured to output the user score based on one or more trends identified from the user transactions.

18. The method of claim 17, wherein the one or more trends are identified by comparing the one or more user transactions with one or more other user data sets for one or more other users, each of the one or more other user data sets including one or more other user transactions for one or more other entities having corresponding other entity scores.

19. The method of claim 11, wherein the user score is based on a percentage of user transactions at entities having respective entity scores that exceed an entity score threshold in comparison to a total number of user transactions.

20. A computer system for transmitting electronic data, the system comprising:

a data storage device storing instructions for transmitting electronic data in an electronic storage medium; and a processor configured to execute the instructions to perform operations including:

receiving a user data set for a user, wherein the user data set includes a user identifier and one or more user authentications for one or more entities;

receiving, from a ranking entity, an entity score for each entity of the one or more entities, the entity score determined by the ranking entity and based on philanthropic activities;

determining a user score for the user based on the one or more user authentications and the score for each of the one or more entities included in the one or more user authentications;

modifying a data store server to store the user identifier and the score for the user;

generating, by a trained machine learning model, a targeted event associated with a user medium, based on the user score, the trained machine learning model trained using entity scores as inputs; and transmitting, to a graphical user interface of a user device of the user, the targeted event via an actionable button, wherein the targeted event is automatically initiated upon receiving input from the user.

* * * * *